July 11, 1944.  W. W. SLOANE  2,353,273
SHAKER CONVEYER
Filed April 23, 1943  6 Sheets-Sheet 1

INVENTOR
William W. Sloane
Clarence F. Poole
ATTORNEY

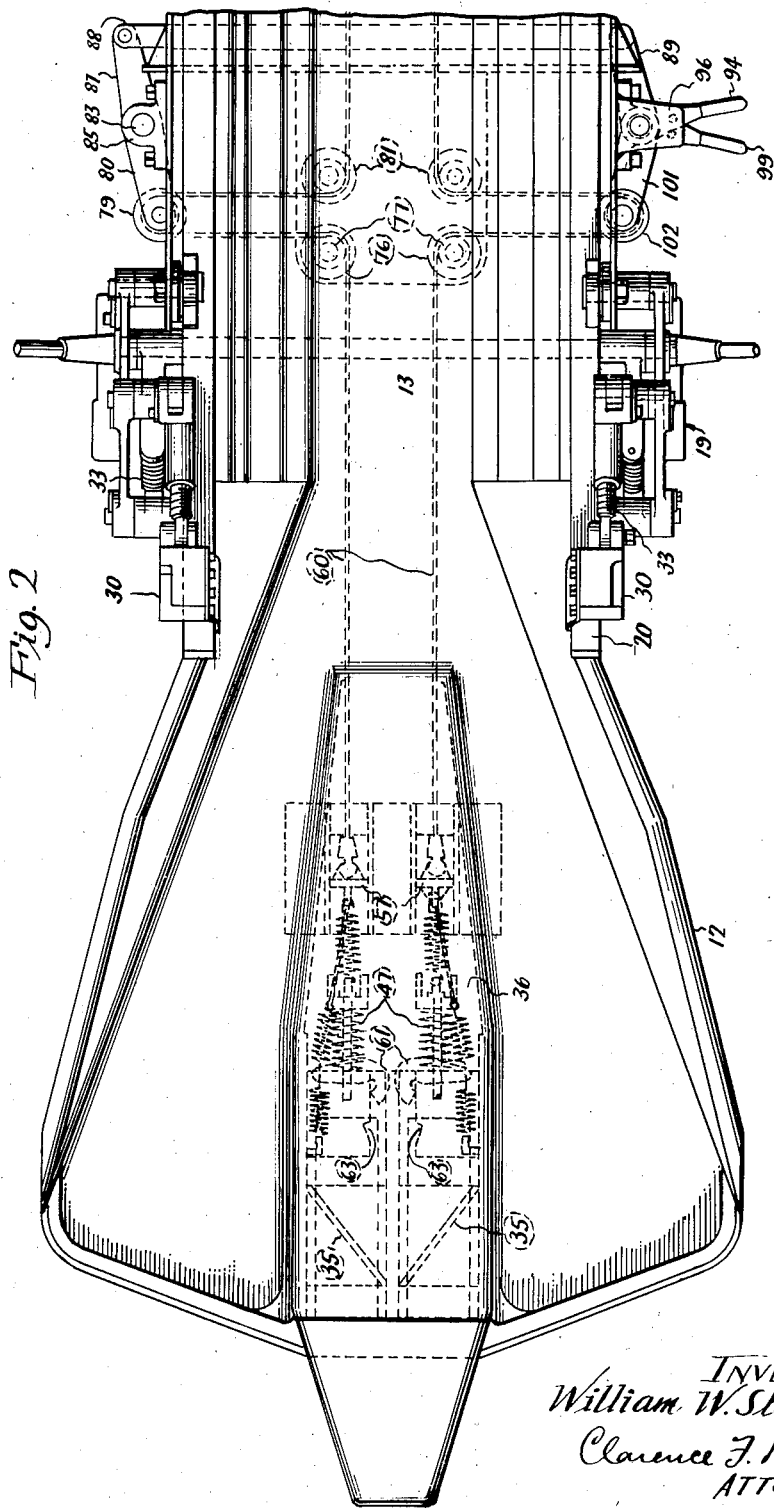

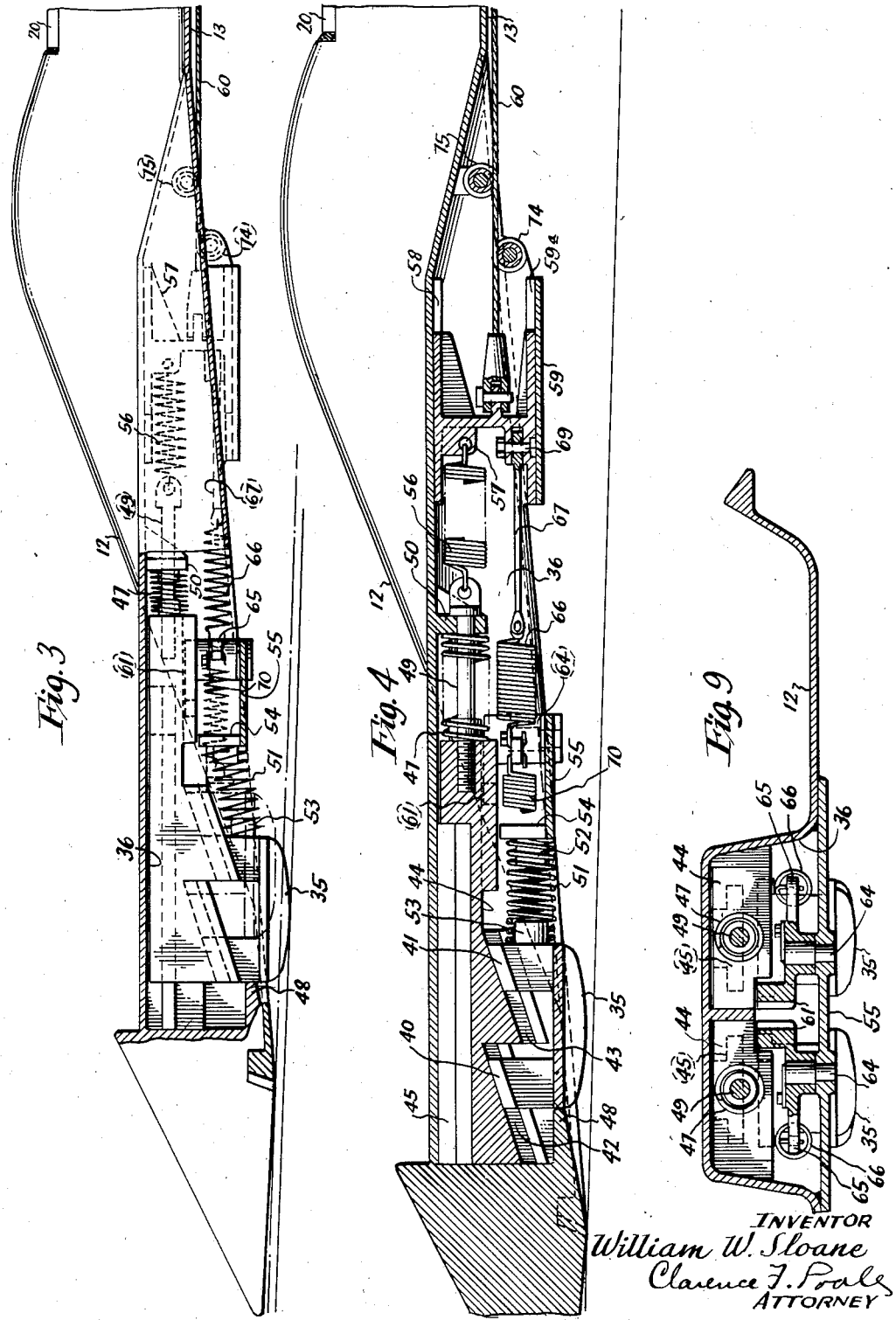

July 11, 1944.    W. W. SLOANE    2,353,273
SHAKER CONVEYER
Filed April 23, 1943    6 Sheets-Sheet 4
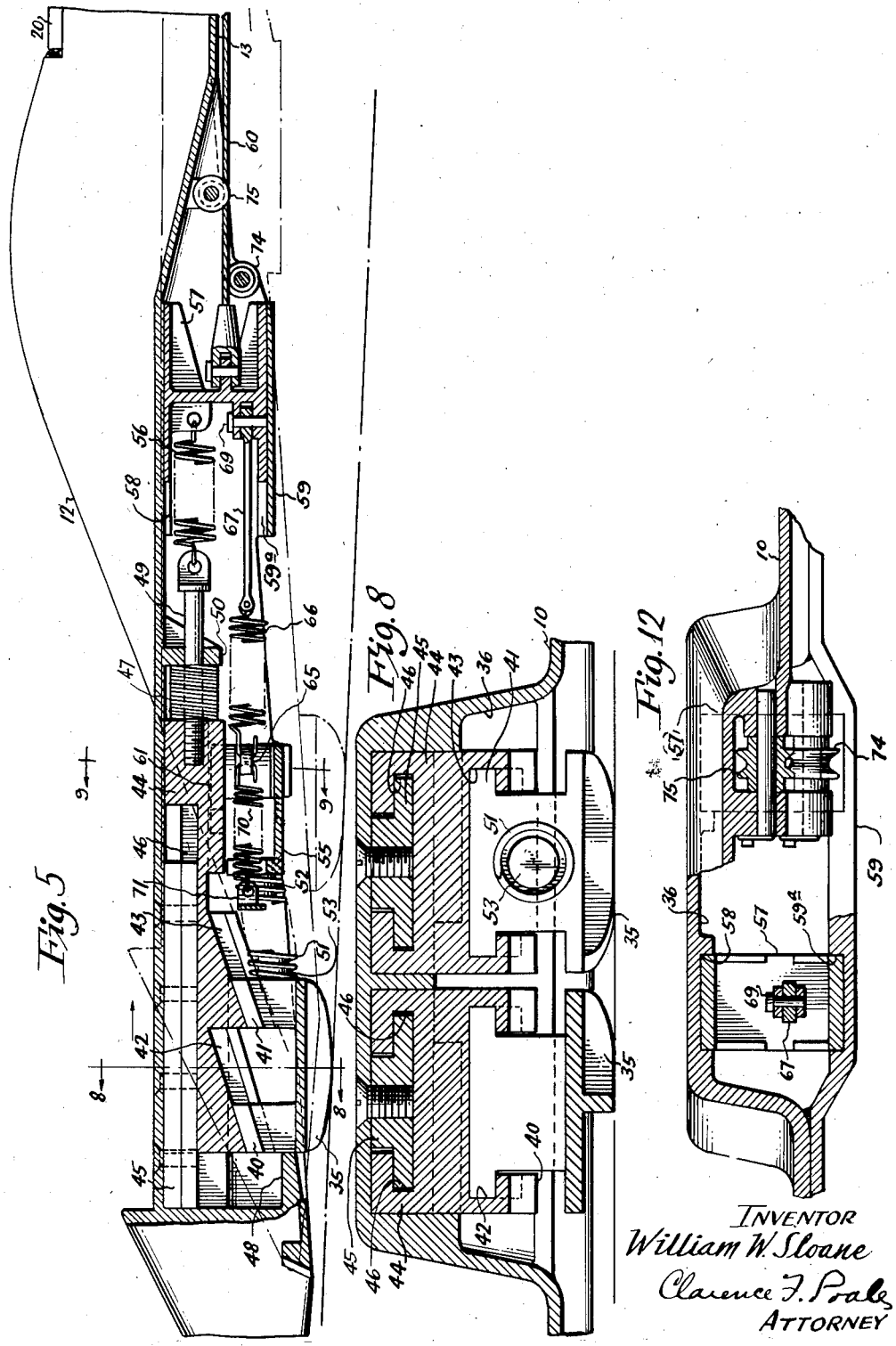
INVENTOR
William W. Sloane
Clarence F. Prale
ATTORNEY July 11, 1944.  W. W. SLOANE  2,353,273
SHAKER CONVEYER
Filed April 23, 1943  6 Sheets-Sheet 5
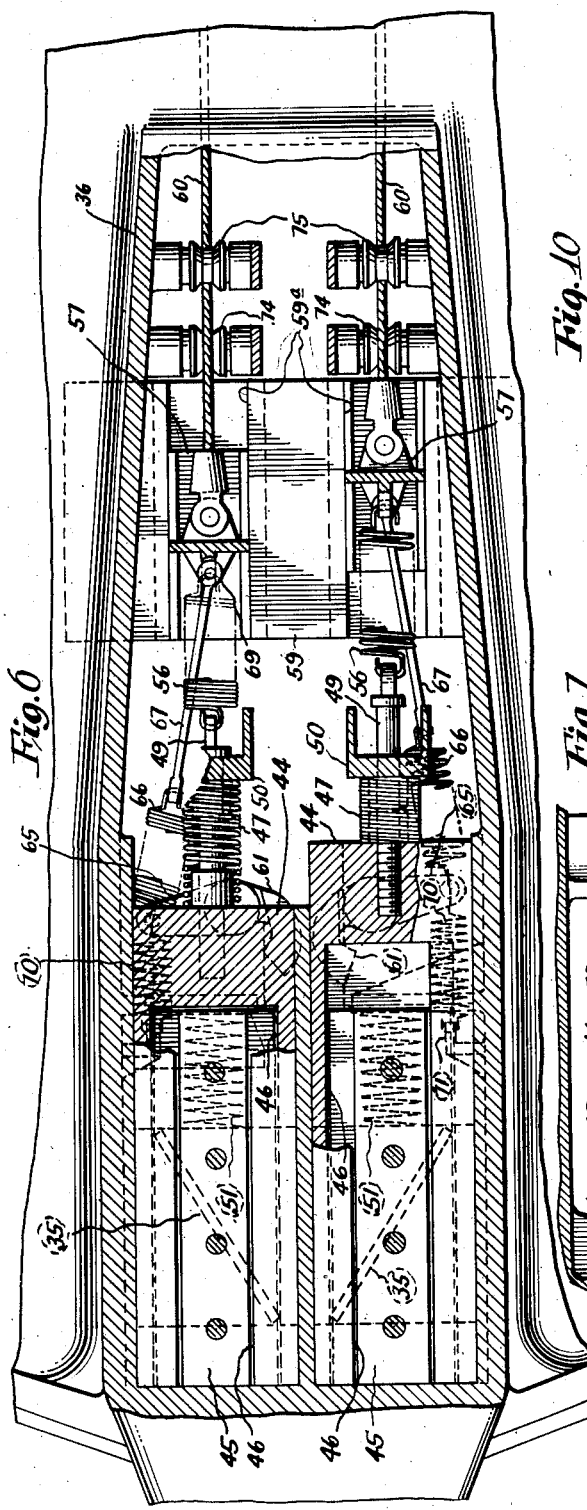
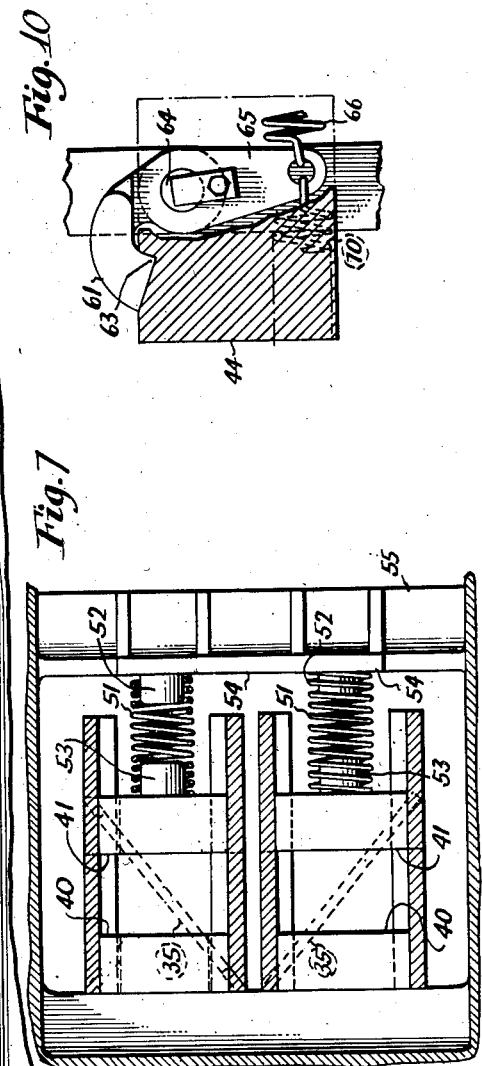
INVENTOR
William W. Sloane
Clarence F. Poole
ATTORNEY

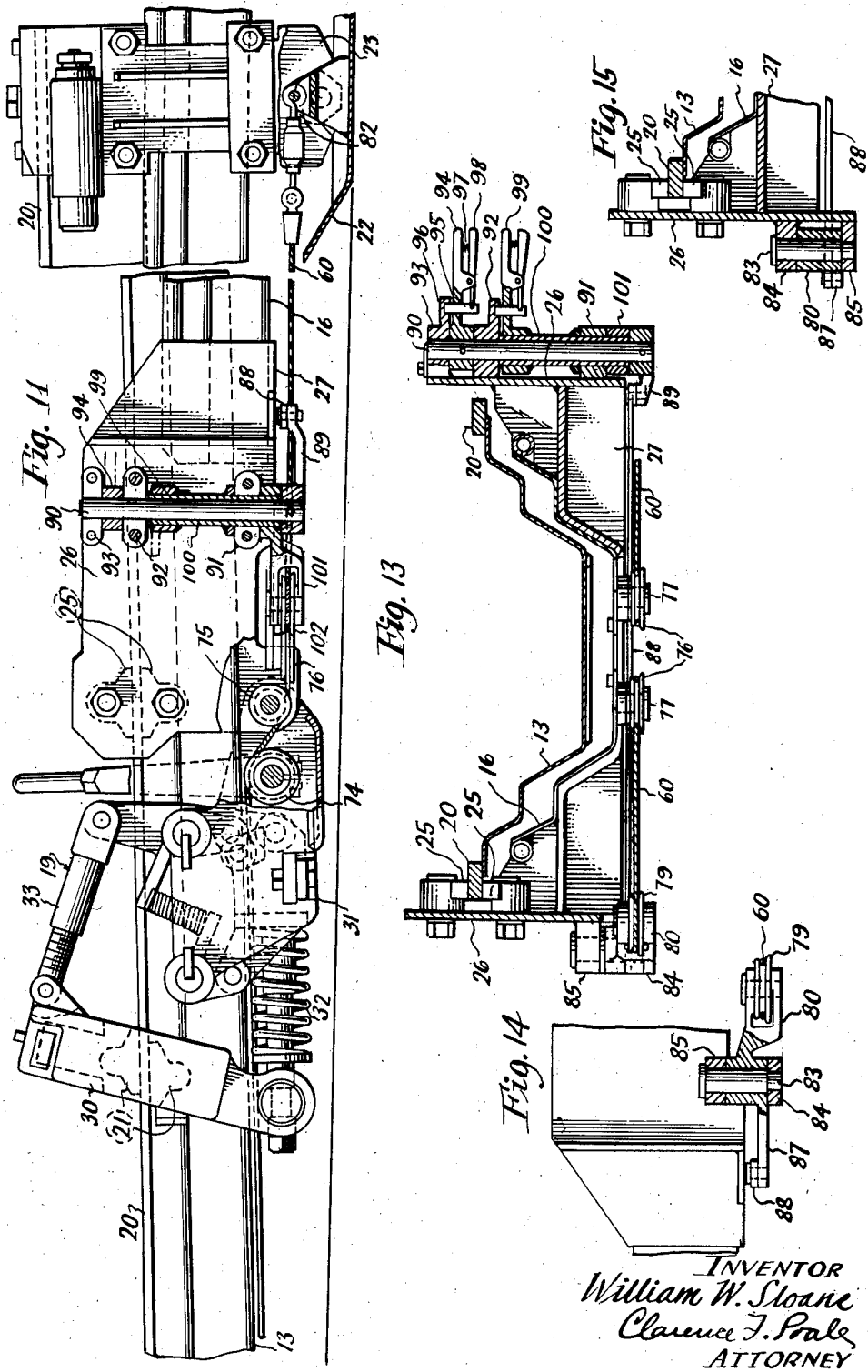

Patented July 11, 1944

2,353,273

UNITED STATES PATENT OFFICE 2,353,273

SHAKER CONVEYER

William W. Sloane, Chicago, Ill., assignor to Goodman Manufacturing Company, Chicago, Ill., a corporation of Illinois Application April 23, 1943, Serial No. 484,179

15 Claims. (Cl. 198—220)

This invention relates to improvements in shaker conveyers and more particularly relates to a new and improved means for laterally swinging the pick-up end of a shaker conveyer.

The principal objects of my invention are to provide a self-contained means of a novel and simplified form for laterally swinging the pick-up end of a shaker conveyer by the reciprocating action of the conveyer.

In carrying out my invention I provide a pair of spaced runners beneath the pick-up end of the shaker conveyer which extend generally longitudinally of the conveyer but at opposite angles with respect to the longitudinal center line thereof, and which are selectively operable to engage the ground during alternate strokes of the conveyer so either one of said runners may lift the pick-up end of the conveyer from the ground and move it laterally during alternate strokes of the conveyer.

Other objects of my invention will appear from time to time as the following specification proceeds and with reference to the accompanying drawings wherein:

Figure 2 is an enlarged plan view of the receiving end of the shaker conveyer trough line shown in Figure 1;

Figure 3 is a view in side elevation of the forward end of a shaker conveyer trough line drawn to substantially the same scale as Figure 2 and showing certain parts broken away and certain other parts in substantially longitudinal section;

Figure 4 is a fragmentary longitudinal sectional view of the forward end of the trough line drawn to substantially the same scale as Figure 3, with certain other parts shown in longitudinal section than in Figure 3 and with the parts in a different position than in Figure 3;

Figure 5 is a fragmentary longitudinal sectional view of the forward end of the shaker conveyer trough line, somewhat similar to Figure 4 but with the parts shown as being in a different position and with certain other parts broken away and in section than in Figure 4;

Figure 6 is an enlarged detail fragmentary plan view of the forward end of the conveyer trough line, with certain parts broken away and certain other parts shown in horizontal section;

Figure 7 is an enlarged detail fragmentary horizontal section view showing certain details of the means for swinging the trough line laterally;

Figure 8 is an enlarged fragmentary transverse sectional view taken substantially along line 8—8 of Figure 5;

Figure 9 is an enlarged fragmentary transverse sectional view taken substantially along line 9—9 of Figure 5;

Figure 10 is an enlarged detail view showing certain details of the latching means for the lateral swinging device;

Figure 11 is a view in side elevation drawn to substantially the same scale as Figure 3 and showing certain details of the control for the lateral swinging device;

Figure 12 is an enlarged partial fragmentary transverse sectional view showing certain details of the control for the lateral swinging device not shown in Figure 11;

Figure 13 is a transverse sectional view drawn to substantially the same scale as Figure 11 and showing certain other details of the control for the lateral swinging device;

Figure 14 is a fragmentary view in side elevation showing certain details of the mounting for one of the control levers; and Figure 15 is a fragmentary transverse sectional view showing certain other details of the mounting for the control lever shown in Figure 14.

Figure 1:
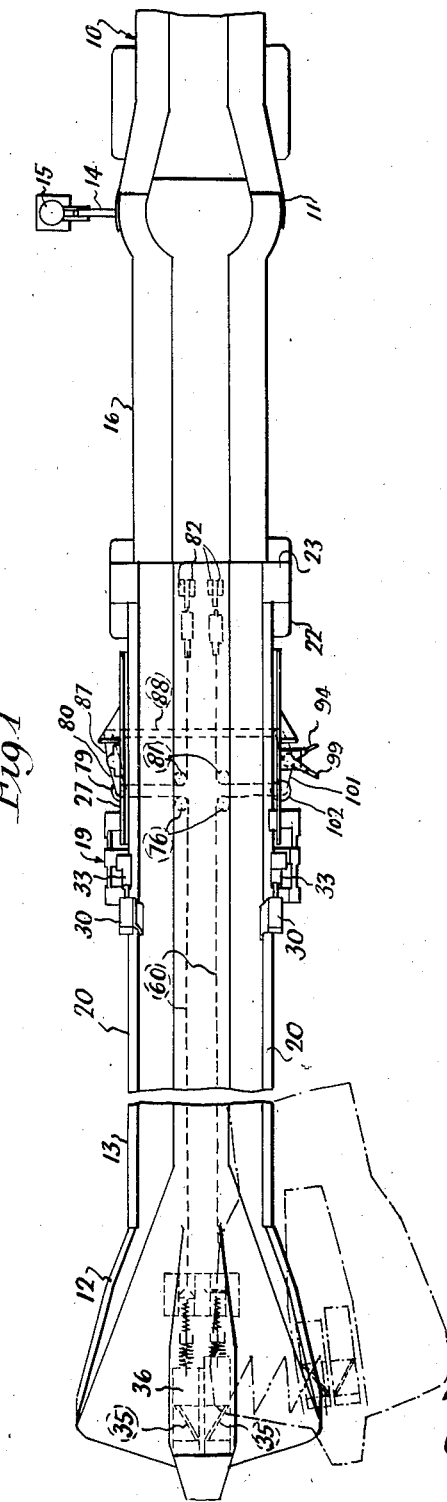
Figure 1 is a plan view of the receiving end of a shaker conveyer trough line having a device constructed in accordance with my invention embodied therein.

In the embodiment of my invention illustrated in the drawings, a shaker conveyer trough line generally indicated by reference character 10 is provided. Said trough line is reciprocably driven from a shaker conveyer drive mechanism (not shown) in a manner well known to those skilled in the art, for moving material from the inby to the outby end thereof by the reciprocable action of the trough line. Said trough line includes a swivel 11, pivotally connecting a shovel 12 on the forward end of an extensible trough 13 to the main trough line and so arranged as to permit the continuous flow of material therealong when said shovel is displaced laterally with respect to the trough line when picking up material from various points along the working place.

The swivel 11 may be of any well known form so will not herein be shown or described in detail and is held in place during reciprocation of the conveyer by means of a pendulum 14, which oscillates about a jack 15, interposed between the ground and the mine roof. A reciprocating trough 16 extends from and has communication with said swivel and extends beneath and is slidably mounted on the extensible trough 13 in a manner which will hereinafter more clearly appear as this specification proceeds. A feeding mechanism indicated generally by reference character 19, and herein shown as being of a well known friction grip type (see Figures 2 and 11), is connected with the forward end of said reciprocating trough, and has gripping engagement with said extensible trough, for extensibly or retractibly moving said extensible trough with respect to said reciprocating trough, by reciprocable movement of the conveyer.

The extensible trough 13 is provided with a pair of bearing plates 20, 20 extending laterally along its upper flanges and adapted to be engaged by grip blocks 21, 21 of the feeding mechanism (see Figure 11). The rear end of said extensible trough is slidably mounted on the ground on a shoe 22, having a pair of parallel spaced supporting legs 23, 23 transversely pivoted to said shoe at their lower ends and suitably secured at their upper ends to the rear ends of said bearing plates.

The forward end of the reciprocating trough is slidably mounted on the extensible trough, for slidable movement with respect thereto, on two pairs of bearing blocks 25, 25, adapted to slidably engage opposite sides of the bearing plates 20, 20. Said bearing blocks are pivotally mounted on upright side walls 26, 26 of a frame 27, which is secured to and projects forwardly from the forward end of said reciprocating trough and which also forms a support for the feeding mechanism 19.

The feeding mechanism 19 may be of any type but is herein shown as being of a friction grip type of feeding mechanism somewhat similar to that shown and described in my prior Patent No. 2,318,808, dated May 11, 1943. Said feeding mechanism includes generally two carrier members 30, 30, each of which has a pair of the grip blocks 21, 21 pivotally mounted thereon and adapted to engage the upper and lower sides of the bearing plates 20, 20. Said carrier members are each mounted in advance of the frame 27 on the forward end of a separate pivoted support frame 31 transversely pivotally connected to and projecting forwardly from the forward end of said frame 27. A yieldable link 32 connects the lower end of each carrier member with said associated pivoted support frame. A link 33 connects the upper end of each carrier member with said associated support frame.

When the yieldable links 32, 32 are held from slidable movement with respect to said pivoted support frames and said links 33, 33 are free to move with respect to said support frames, a forward thrusting force will be exerted on the lower ends of said carrier member during the forward strokes of the conveyer, to engage the friction grip blocks 21, 21 with the bearing plates 20, 20 during the forward strokes of the conveyer, to extend said extensible trough with respect to said reciprocating trough.

When the links 33, 33 are held from movement with respect to their associated support frames, and the yieldable links 32, 32 are free to move with respect thereto, said links 33, 33 will exert a pulling force on the upper ends of said carrier members during the return strokes of the conveyer, to retractibly move said extensible trough with respect to said reciprocating trough.

Referring now in particular to the novel means for swinging the shovel 12 and extensible trough 13 laterally about the axis of the swivel 11, during reciprocable movement of the conveyer, a pair of ground engaging runners 35, 35 are slidably mounted in the underside of a raised longitudinally extending central portion 36, formed in the bottom of the shovel 12 and opening towards the ground. Each of said runners extends generally longitudinally of the conveyer and its ground engaging surface is horizontally inclined outwardly from the forward to the rear ends thereof, one of said runners being adapted to swing said shovel in one direction and the other of said runners being adapted to swing said shovel in an opposite direction. Inasmuch as the construction and operation of each of said runners is the same, one only will herein be described in detail.

The runner 35 is provided with upwardly spaced, integrally formed, longitudinally extending, oppositely projecting gibs 40, 40 inclined upwardly from the forward to the rear end thereof and disposed adjacent the forward end of said runner. Said runner is also provided with corresponding rearwardly spaced gibs 41, 41. Said gibs are adapted to be slidably guided in inclined channelled guides 42, 43 formed in the underside of a guide member 44. Said guide member is mounted in the open portion 36, for longitudinal slidable movement with respect thereto on a gibbed guide 45. Said last mentioned guide is secured to and depends from the underside of said raised portion and engages facing channelled guides 46, 46, formed in the upper surface of said guide member.

The guide member 44 is urged in the forwardly extended position shown in Figure 4, by a compression spring 47. Said spring encircles a rod 49 threaded in the rear end of said guide member and projecting rearwardly therefrom, and is interposed between the rear end of said guide member and the forward end of a bracket 50, depending from the top of the inside of the raised central portion 36. Said bracket also has said rod mounted therein and forms a slidable guide therefor. When said guide member is in the forward position shown in Figure 4, the guides 40 and 41 of the runner 35 will be in the upper part of the channelled guides 42, 43. This will raise said runner out of engagement with the ground during reciprocable movement of the conveyer, said runner being stopped from forward and downward movement by a stop 48, projecting rearwardly from the lower inner portion of the tip of the shovel.

A compression spring 51 is provided to urge the runner 35 into the forwardly extended position shown in Figures 3, 4 and 5. Said spring abuts the rear end of said runner at its forward end and encircles a boss 53 formed integrally with and projecting rearwardly from said runner. The opposite end of said spring abuts an upright plate 54, projecting upwardly from a cross frame member 55, which extends across the lower portion of the raised portion 36. Said end of said spring encircles a boss 52 projecting forwardly from said lug.

When the guide member 44 is moved to a rearward position along the guide 45, against the compression spring 47, as shown in Figures 3 and 5, the compression spring 51 will urge the runner 35 into engagement with the ground. Upon the return strokes of the conveyer, said shoe engaging the ground will be moved forwardly along the inclined guides 42 and 43 into engagement with the stop 48, to raise the forward end of the shovel 12 above the ground. Said runner being disposed at an acute angle to the longitudinal center line of the trough 13 and shovel 12, and supporting said shovel above the ground, will move said shovel and trough about the axis of the swivel 11 an amount determined by the angle of said runner with respect to the longitudinal center line of said trough, and the length of stroke of the conveyer. As soon as the return stroke of the conveyer has been completed, and the conveyer starts on its forward stroke, the frictional resistance of said runner against the ground will cause it to move upwardly in the inclined guides 42, 43 against the compression spring 51, to lower the shovel 12 into engagement with the ground and permit said shovel to move in a straight line during its forward strokes.

It should here be understood that the shaker conveyers in use today make from 70 to 90 forward and return strokes a minute and that the length of each stroke is from 7 to 9 inches. The shovel may thus be swung laterally by the runner 35 at a relatively rapid rate of speed, as said runner supports the trough above the ground during the return strokes of the conveyer. It should further be understood that with a reversal in the direction of the angles of the runners 35, 35 with respect to the longitudinal center line of the conveyer, so they converge towards their rear ends instead of their forward ends, and with a reversal in the direction of inclination of the guides 42 and 43, lateral movement of the shovel may be attained on the forward strokes of the conveyer instead of the return strokes.

Referring now to the means for controlling operation of the runner 35, the rod 49 is herein shown as being in the form of an eye bolt having a tension spring 56 connected to its eye and extending rearwardly therefrom. Said tension spring is slightly stronger than the compression spring 47 and its end opposite said eye bolt is secured to an operating member 57, which is slidably guided at its upper end in the under portion of the raised portion 36 in laterally spaced parallel guides 58, 58 and at its lower end in a supporting plate 59 extending across the bottom of the raised portion 36. Said plate has laterally spaced guides 59a, 59a formed integral therewith and forms a support and guide for said operating member. A cable 60 is connected to the rear end of said operating member 57, to move said operating member and the guide member 44 in a rearward direction.

The cable 60 extends rearwardly from the operating member 57 over a pulley 74, under a pulley 75, to and around a pulley 76 mounted on the bottom of the support 27, on a vertical pin 77. From thence said cable is trained outwardly around a pulley 79 mounted on the free end of a lever arm 80. Said cable is trained from said pulley inwardly and around a pulley 81 spaced rearwardly of but in longitudinal alignment with the pulley 76. Said cable extends from said last-named pulley to a pair of parallel spaced lugs 82, 82 projecting upwardly from the shoe 22, and is connected therebetween at its rear end.

The lever arm 80 is mounted between a pair of spaced bearing brackets 84 and 85 on a vertical pin 83. Said bearing brackets are secured to and project laterally from the lower portion of the right-hand side wall 26 of the support 27. A lever arm 87 is formed integrally with said lever arm 80 and projects rearwardly from said pin. A link 88 is pivotally connected to the free end of said lever arm 87 and extends transversely beneath the reciprocating trough 16 and is pivotally connected to a lever arm 89 mounted on the lower end of a vertical shaft 90, which is journaled in spaced bearing brackets 91, 92 and 93 secured to and extending laterally from the left-hand side wall 26.

A hand lever 94 is secured to the vertical shaft 90, adjacent its upper end, and projects outwardly therefrom. Said hand lever is locked in various desired operative positions by means of a pin 95 adapted to register for engagement with any one of a plurality of apertures formed in the underside of a sector 96, projecting outwardly from the bearing bracket 93. A spring 97 engaging a lever arm 98 pivoted to said hand lever intermediate its ends and engaging the pin 95 at its inner end, is provided to urge said pin into locking engagement with the desired aperture.

The guide member 44 and runner 35 on the opposite or left-hand side of the shovel 12 are operated from the same side of the machine as the right-hand guide member and runner by means of a hand lever 99, secured to a sleeve 100 which encircles the vertical shaft 90 and which is journaled in the lower bearing bracket 91 (see Figure 13). A lever arm 101 is secured to the lower end of said sleeve and is rocked upon rocking movement of said sleeve and hand lever. A pulley 102 is mounted on the end of said lever arm and engages the bight formed by the cable as it passes around the pulleys 76 and 79, to move the left-hand guide member 44 rearwardly along the guide 45 so as to position the left-hand runner 35 to swing the shovel 12 to the left during the return strokes of the conveyer.

It should here be noted that the cable 60 travels with the extensible trough and shovel and that the lever arms 80 and 101 are mounted on the forward end of the reciprocating trough 16, so the laterally swinging device may be operated from the forward end of the reciprocating trough regardless of the position of the extensible trough with respect to the reciprocating trough. The cables 60, 60 are herein shown as being operated from one side of the machine only, for the purpose of simplicity, but it may readily be understood that the control levers therefor may be so arranged that they may be operated from both sides of the machine, if desired.

A latching means operated by the cable 60 and operating member 57 is provided to hold the guide member 44 in a rearward position along the guide 45 and to relieve tension from the cable 60 during swinging movement of the shovel 12. Said latching means, as herein shown, includes a pawl 61 engageable with a notch 63 formed in an inner side of the guide member 44. Said pawl is mounted on a pivotal pin 64 mounted in the cross frame member 55 and projecting upwardly therefrom. A lever arm 65 projects outwardly from said pawl and is shown as being formed integral therewith. A tension spring 66 is connected to the free end of said lever arm at one of its ends and is connected to the operating member 57 at its opposite end by means of a rod 67, which is pivotally connected to said operating member by means of a pivotal pin 69. A tension spring 70 is also connected to the outer end of said lever arm and extends in an opposite direction from the tension spring 66. Said tension spring is adapted to release said pawl from said notch 63 upon release of said tension spring 66 and is lighter than said tension spring 66. Said tension spring 70 is connected at its end opposite from said lever arm to a connecting lug 71, extending inwardly from a side wall of the open housing 36.

When the guide member 44 is moved rearwardly by means of the cable 60 through the tension spring 56, the rod 67 will extend the tension spring 66 and exert a force on the pawl 61, to engage said pawl with the notch 63 and hold said guide member in a rearwardly extended position. At this time the pin 95 on the hand lever 94 will be urged into engagement with the proper aperture on the sector 96. The runner 35 will then be in a position to engage the ground and elevate the shovel above the ground during the return strokes of the conveyor and swing the shovel and extensible trough laterally in one direction.

When the pin 95 is disengaged from its aperture, tension on the spring 66 will be released and the tension spring 70 will pivot the lever arm 65 in a direction to release the pawl 61 from the notch 63. As soon as said pawl is released, the compression spring 47 will return the guide member 44 to a forward position in the gibbed guide 45. The runner 35 will be urged into engagement with the stop 48 and will be in an upper position in the guides 42, 43, out of engagement with the ground. The shovel 12 will then move back and forth along the ground in the direction of its longitudinal axis.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a device for moving the pick-up end of a shaker conveyer laterally along the ground, a reciprocating trough, a runner on the underside of said trough extending at an angle to the longitudinal center line of said trough, and means selectively operable to slidably engage said runner with the ground, to cause said runner to lift the forward end of said trough off of the ground during alternate strokes of the conveyer, to cause lateral swinging movement of said reciprocating trough during said alternate strokes of the conveyer.

2. In a device for moving the pick-up end of a shaker conveyer laterally along the ground, a reciprocating trough, a pair of runners on the underside of said trough extending generally longitudinally of said trough at opposite angles with respect to the longitudinal center line thereof, and means selectively operable to move either of said runners to a position to engage and lift the forward end of said trough off of the ground during alternate strokes of the conveyer, to cause lateral swinging movement of said reciprocating trough in one direction or another.

3. In a device for moving the pick-up end of a shaker conveyer laterally along the ground, a reciprocating trough, a guide member extending longitudinally of said trough, a runner mounted in said guide member for slidable movement with respect thereto and extending generally longitudinally of said trough, but at an angle to the direction of movement thereof, and means selectively operable to move said guide to a position to cause said runner to engage and lift the forward end of said trough off of the ground during alternate strokes of the conveyer, to cause lateral swinging movement of said reciprocating trough during said alternate strokes of the conveyer.

4. In a device for moving the pick-up end of a shaker conveyer laterally along the ground, a reciprocating trough, a guide member guided on the underside of said trough for longitudinal movement with respect thereto, a runner extending generally longitudinally of said trough, but at a horizontal angle with respect thereto and slidably guided in said guide member for longitudinal movement with respect thereto, to engage and lift the forward end of said trough above the ground during alternate strokes of the conveyer, and swing said reciprocating trough laterally upon the stroke of the conveyer said trough is raised above the ground by said runner.

5. In a device for moving the pick-up end of a shaker conveyer laterally along the ground, a reciprocating trough, a guide member guided for longitudinal movement with respect to said trough and having a longitudinal guide inclined upwardly from the forward end thereof, a runner slidably guided in said inclined guide, said runner extending at a horizontal angle with respect to said trough, and being adapted to engage and raise the forward end of said reciprocating trough above the ground during certain strokes of the conveyer, a stop for limiting forward movement of said runner along said inclined guide, and means manually operable to move said guide member into position to cause said runner to engage the ground and to be moved into engagement with said stop by frictional resistance with the ground during the return strokes of the conveyer, to cause said runner to raise the forward end of said trough above the ground and to swing said trough laterally during said return strokes of the conveyer.

6. In a device for moving the pick-up end of a shaker conveyer laterally along the ground, a reciprocating trough, a guide member guided for longitudinal movement with respect to said trough and having a longitudinal guide inclined upwardly from the forward end thereof, a runner slidably guided in said inclined guide, said runner extending at a horizontal angle with respect to said trough, and being adapted to engage and raise the forward end of said reciprocating trough above the ground during certain strokes of the conveyer, yieldable means for urging said runner towards the forward end of said inclined guide, other yieldable means for urging said guide member towards the forward end of said reciprocating trough, and means operable to move said guide member in position to cause said runner to engage the ground and be moved to the forward end of said inclined guide during the return strokes of the conveyer, to raise the forward end of said trough above the ground and to swing said trough laterally during said return strokes of the conveyer.

7. In a device for moving the pick-up end of a shaker conveyer laterally along the ground, a reciprocating trough, a guide member guided for longitudinal movement with respect to said trough and having a longitudinal guide inclined upwardly from the forward end thereof, a runner slidably guided in said inclined guide, the ground engaging surface of said runner extending at a horizontal angle with respect to said trough, and being adapted to engage and raise the forward end of said reciprocating trough above the ground during certain strokes of the conveyer, yieldable means for urging said runner towards the forward end of said inclined guide, a stop for limiting forward movement of said runner along said inclined guide, other yieldable means for urging said guide member towards the forward end of said reciprocating trough, and means manually operable to move said guide member in position to cause said runner to engage the ground, and be moved into engagement with said stop by frictional resistance of said runner with the ground during the return strokes of the conveyer, to cause said runner to raise the forward end of said trough above the ground and to swing said trough laterally during said return strokes of the conveyer.

8. In a device for moving the pick-up end of a shaker conveyer laterally along the ground, a reciprocating trough, a guide member guided for longitudinal movement with respect to said trough and having a longitudinal guide inclined upwardly from the forward end thereof, a runner slidably guided in said inclined guide, said runner extending at a horizontal angle with respect to said trough, and being adapted to engage and raise the forward end of said reciprocating trough above the ground during certain strokes of the conveyer, yieldable means for urging said runner towards the forward end of said inclined guide, other yieldable means for urging said guide member towards the forward end of said reciprocating trough, and means selectively operable to move said guide member in position to cause said runner to engage the ground and be moved to the forward end of said inclined guide during the return strokes of the conveyer, to raise the forward end of said trough above the ground and to swing said trough laterally during said return strokes of the conveyer including a hand lever having operative connection with said guide member, latching means connectible with said guide member, and operable to hold said guide member in a position to cause said runner to engage the ground during the return strokes of the conveyer, and means for releasing said latching means upon release of said hand lever to permit said guide member to be moved to a position to raise said runner out of engagement with the ground during the forward and return strokes of the conveyer.

9. In a device for moving the pick-up end of a shaker conveyer laterally along the ground, a reciprocating trough, a guide member guided for longitudinal movement with respect to said trough and having a longitudinal guide inclined upwardly from the forward end thereof, a runner slidably guided in said inclined guide, said runner extending at a horizontal angle with respect to said trough and being adapted to engage and raise the forward end of said reciprocating trough above the ground during certain strokes of the conveyer, yieldable means for urging said runner towards the forward end of said inclined guide, other yieldable means for urging said guide member towards the forward end of said reciprocating trough, and means selectively operable to move said guide member in position to cause said runner to engage the ground and be moved to the forward end of said inclined guide during the return strokes of the conveyer, to raise the forward end of said trough above the ground and to swing said trough laterally during said return strokes of the conveyer including a hand lever having operative connection with said guide member, a latching lever engageable with said guide member, for holding said guide member in a position to cause said runner to engage the ground during the return strokes of the conveyer, a yieldable member connectible between said latching lever and said hand lever, for moving said latching lever to and for holding said latching member in a locked position, and another yieldable member acting in a direction opposite to said last mentioned yieldable member, for positively moving said latching lever to an unlocked position upon the release of said hand lever.

10. In a device for moving the pick-up end of a shaker conveyer laterally along the ground, a reciprocating trough, a guide member guided for longitudinal movement along said trough, a runner slidably guided in said guide member and having a ground engaging surface extending at a horizontal angle with respect to the longitudinal center line of said trough, said runner being guided in said guide member for longitudinal movement with respect thereto at an angle inclined upwardly from the forward end of said guide member, yieldable means having connection with said guide member, to positively move said guide member to a position to lift said runner out of engagement with the ground, yieldable means having connection with said runner, to urge said runner into a forward position with respect to said guide member, and manually operable means to move said guide member to a position to cause said runner to engage the ground and to be moved to the forward end of said inclined guide by frictional resistance between said runner and the ground to lift said reciprocating trough out of engagement with the ground and to swing said trough laterally during the return strokes of the conveyer.

11. In a device for moving the pick-up end of a shaker conveyer laterally along the ground, a reciprocating trough, a guide member guided for longitudinal movement along said trough, a runner slidably guided in said guide member and having a ground engaging surface extending at a horizontal angle with respect to the longitudinal center line of said trough, said runner being guided in said guide member for longitudinal movement with respect thereto at an angle inclined upwardly from the forward end of said guide member, yieldable means having connection with said guide member, to positively move said guide member to a position to lift said runner out of engagement with the ground, yieldable means having connection with said runner, to urge said runner into a forwardmost position with respect to said guide member, a manually operable hand lever having connection with said guide member for moving said guide member against said yieldable means to a position to cause said runner to engage the ground and to be moved into a forward position with respect to said inclined guide by frictional resistance between said runner and the ground during the return strokes of the conveyer, to cause said runner to lift said reciprocating trough out of engagement with the ground during said return strokes of the conveyer, latching means connectible with said hand lever and having engagement with said guide member, for holding said guide member in said position, and yieldable means for releasing said latching means upon release of said hand lever, to permit said first mentioned yieldable means to move said guide member to a forwardmost position with respect to said trough and to lift said runner out of engagement with the ground.

12. In a device for moving the pick-up end of a shaker conveyer laterally along the ground, a reciprocating trough, a pair of guide members mounted in side by side relation on the underside of said trough and guided for longitudinal movement with respect thereto, a pair of runners extending generally longitudinally of said trough and slidably guided in said guide members for longitudinal movement with respect thereto, the ground engaging surface of each of said runners extending at an opposite acute angle with respect to the longitudinal center line of said trough, and means selectively operable to move either one of said guide members to a position to cause its associated runner to engage and lift the forward end of said trough above the ground during alternate strokes of the conveyer, to swing said trough laterally in one direction or another.

13. In a device for moving the pick-up end of a shaker conveyer laterally along the ground, a reciprocating trough, a pair of guide members mounted in side by side relation on the underside of said trough and guided for longitudinal movement with respect thereto, each of said guide members having an inclined guide formed therein, inclined upwardly from the forward to the rear end thereof, a runner guided in each of said inclined guides, said runners each having a ground engaging surface extending at an opposite angle to the longitudinal center line of said trough, and means selectively operable to move either one of said guide members to a position to cause its associated runner to move forwardly along its associated guide upon the return strokes of the conveyer, and to lift said trough above the ground during said strokes of the conveyer, to swing said trough laterally in one direction or another.

14. In a device for moving the pick-up end of a shaker conveyer laterally along the ground, a reciprocating trough, a pair of guide members mounted in side by side relation on the underside of said trough and guided for longitudinal movement with respect thereto, each of said guide members having an inclined guide inclined upwardly from the forward to the rear end thereof, a runner guided in each of said inclined guides, said runners each having a ground engaging surface extending at an opposite angle to the longitudinal center line of said trough, yieldable means for urging said runners towards the forward ends of said inclined guides, stopping means for limiting forward movement of said runners in said guides, other yieldable means for urging said guide members towards the forward end of said reciprocating trough, and means selectively operable to move either of said guide members in position to cause said associated runner to engage the ground and to be moved into engagement with said stopping means during the return strokes of the conveyer, to cause said associated runner to raise the forward end of said trough above the ground and to swing said trough laterally during said return strokes of the conveyer.

15. In a device for moving the pick-up end of a shaker conveyer laterally along the ground, a reciprocating trough, a pair of guide members mounted in side by side relation on the underside of said trough and guided for longitudinal movement with respect thereto, each of said guide members having an inclined guide formed therein, inclined upwardly from the forward end thereof, a runner guided in each of said inclined guides, said runners each having a ground engaging surface extending at an opposite angle to the longitudinal center line of said trough, yieldable means for urging said runners towards the forward ends of said inclined guides, stopping means for limiting forward movement of said runners in said guides, other yieldable means for urging said guide members towards the forward end of said reciprocating trough, a pair of hand levers selectively operable to move either one of said guide members in position to cause its associated runner to engage the ground and to be moved into engagement with said stopping means by frictional resistance of said runner against the ground during the return strokes of the conveyor, to cause said associated runner to raise the forward end of said trough above the ground and move said trough laterally during said return strokes of the conveyor, latching means for holding said guide members in position to cause their associated runners to engage the ground, and yieldable means for releasing said latching means upon the release of its associated hand lever to cause said yieldable means associated with said guide members to return said guide members to a forwardmost position with respect to said trough.

WILLIAM W. SLOANE.